(12) United States Patent
Sodani et al.

(10) Patent No.: US 10,346,300 B2
(45) Date of Patent: *Jul. 9, 2019

(54) PROVIDING MULTIPLE MEMORY MODES FOR A PROCESSOR INCLUDING INTERNAL MEMORY

(71) Applicant: Intel Corporation, Santa Clara, CA (US)

(72) Inventors: Avinash Sodani, Portland, OR (US); Robert J. Kyanko, Portland, OR (US); Richard J. Greco, West Linn, OR (US); Andreas Kleen, Portland, OR (US); Milind B. Girkar, Sunnyvale, CA (US); Christopher M. Cantalupo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/628,811

(22) Filed: Jun. 21, 2017

(65) Prior Publication Data

US 2017/0357580 A1  Dec. 14, 2017

Related U.S. Application Data

(63) Continuation of application No. 14/541,504, filed on Nov. 14, 2014, now Pat. No. 9,720,827.

(51) Int. Cl.
| | |
|---|---|
| *G06F 12/00* | (2006.01) |
| *G06F 13/00* | (2006.01) |
| *G06F 12/06* | (2006.01) |
| *G06F 12/02* | (2006.01) |

(52) U.S. Cl.
CPC ........ *G06F 12/0646* (2013.01); *G06F 12/023* (2013.01); *G06F 2212/283* (2013.01)

(58) Field of Classification Search
CPC ............... G06F 12/023; G06F 12/0646; G06F 2212/283
USPC ........................................................ 711/119
See application file for complete search history.

(56) References Cited

U.S. PATENT DOCUMENTS

| | | | | |
|---|---|---|---|---|
| 5,825,878 | A * | 10/1998 | Takahashi | G06F 21/79 713/190 |
| 6,088,358 | A * | 7/2000 | Tomita | H04L 49/254 370/237 |
| 9,384,152 | B2 * | 7/2016 | Best | G06F 13/1689 |
| 2003/0001852 | A1 * | 1/2003 | Tuomi | G06T 1/60 345/531 |
| 2003/0065889 | A1 * | 4/2003 | Kamitani | G06F 12/0862 711/137 |
| 2003/0221072 | A1 * | 11/2003 | Azevedo | G06F 12/0862 711/154 |

(Continued)

*Primary Examiner* — Sheng Jen Tsai
(74) *Attorney, Agent, or Firm* — Trop, Pruner & Hu, P.C.

(57) ABSTRACT

In one embodiment, a processor comprises: at least one core formed on a die to execute instructions; a first memory controller to interface with an in-package memory; a second memory controller to interface with a platform memory to couple to the processor; and the in-package memory located within a package of the processor, where the in-package memory is to be identified as a more distant memory with respect to the at least one core than the platform memory. Other embodiments are described and claimed.

20 Claims, 16 Drawing Sheets

(56) References Cited

U.S. PATENT DOCUMENTS

| | | | |
|---|---|---|---|
| 2004/0225830 A1* | 11/2004 | DeLano | G06F 12/0893 711/105 |
| 2006/0069525 A1* | 3/2006 | Nalawadi | G06F 1/206 702/136 |
| 2006/0149804 A1* | 7/2006 | Luick | G06F 7/5443 708/626 |
| 2008/0140661 A1* | 6/2008 | Pandya | G06F 17/30979 |
| 2008/0229026 A1* | 9/2008 | Chung | G06F 12/0846 711/132 |
| 2009/0132749 A1* | 5/2009 | Jones | G06F 12/0862 711/3 |
| 2010/0070696 A1* | 3/2010 | Blankenship | G06F 13/4243 711/105 |
| 2011/0299317 A1* | 12/2011 | Shaeffer | G11C 13/0002 365/106 |
| 2013/0151569 A1* | 6/2013 | Therien | G06F 17/30339 707/803 |
| 2013/0159757 A1* | 6/2013 | Park | G11C 15/00 713/400 |
| 2013/0254486 A1* | 9/2013 | McCormick, Jr. | G06F 12/0875 711/122 |
| 2014/0010007 A1* | 1/2014 | Cho | H01L 27/088 365/182 |
| 2014/0068291 A1* | 3/2014 | Man | G06F 1/32 713/320 |
| 2014/0189239 A1* | 7/2014 | Hum | G06F 12/0831 711/122 |
| 2014/0201446 A1* | 7/2014 | Steeley, Jr. | G06F 13/28 711/121 |
| 2014/0223098 A1* | 8/2014 | Lee | G06F 9/5016 711/118 |
| 2014/0223105 A1* | 8/2014 | Shwartsman | G06F 9/3814 711/135 |
| 2014/0298454 A1* | 10/2014 | Heng | G06F 21/55 726/22 |
| 2015/0178204 A1* | 6/2015 | Ray | G11C 5/04 711/103 |
| 2015/0237025 A1* | 8/2015 | Pal | H04L 63/06 713/165 |
| 2015/0378604 A1* | 12/2015 | Kawakami | G06F 3/06 710/5 |
| 2015/0379670 A1* | 12/2015 | Koker | G06T 1/20 345/502 |
| 2015/0379762 A1* | 12/2015 | Bleiweiss | G06T 1/20 345/625 |
| 2015/0379763 A1* | 12/2015 | Liktor | G06T 15/80 345/426 |
| 2016/0041856 A1* | 2/2016 | Sankaralingam | G06F 15/7821 719/330 |
| 2016/0092363 A1 | 3/2016 | Wang et al. | |
| 2016/0140039 A1* | 5/2016 | Sodani | G06F 12/0646 711/119 |
| 2017/0147496 A1* | 5/2017 | Sasanka | G06F 12/0811 |
| 2018/0032429 A1* | 2/2018 | Liu | G06F 12/0873 |

\* cited by examiner

PROVIDING MULTIPLE MEMORY MODES FOR A PROCESSOR INCLUDING INTERNAL MEMORY

This application is a continuation of U.S. patent application Ser. No. 14/541,504, filed Nov. 14, 2014, the content of which is hereby incorporated by reference.

TECHNICAL FIELD

Embodiments relate to memory management in a computer system.

BACKGROUND

In many computer systems, one or more processors interact with a platform memory formed of separate memory devices. For example, common memory architectures provide for dual in-line memory models (DIMMs) that couple to a motherboard on which a processor package is adapted. However, as form factors become smaller, such designs become less suitable. Furthermore, there can be a high latency associated with accessing memory outside the processor package.

DETAILED DESCRIPTION

A platform including a processor in accordance with an embodiment includes multiple distinct types of memory, including high bandwidth memory (referred to herein also as multi-channel memory (MCDRAM)) or in-package memory) and bulk or off-package memory, referred to herein as a main or platform memory, which in an embodiment may be implemented with double data rate (DDR) dynamic random access memory (DRAM). Collectively, the memories may form a system memory. Using an embodiment, a programmer can use MCDRAM as addressable memory similar to DDR to obtain maximum use of high bandwidth capabilities. Embodiments provide a method to expose both MCDRAM and DDR to software as one flat memory using non-uniform memory architecture (NUMA) mechanisms of an operating system to provide a mechanism that is portable with minimal software enabling.

Figure 1:
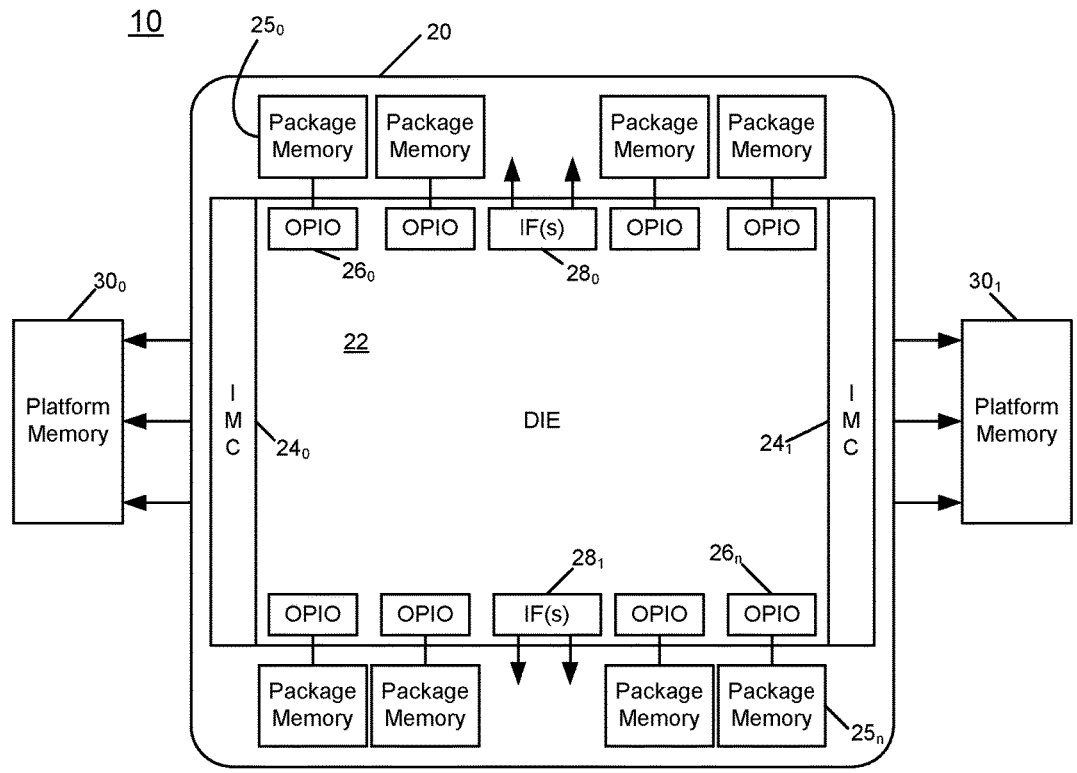
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 10 may be part of a given computing device ranging from a portable computing device such as smartphone, tablet computer, laptop computer or so forth to a personal computer, server computer or so forth. In the portion of the system shown in FIG. 1, a system on chip (SoC) or other processor 20 is coupled to a platform memory $30_1$-$30_2$, which in an embodiment may be formed of DRAM, e.g., DDR DRAM. In the embodiment of FIG. 1, SoC 20 may be implemented within a single package and can include a semiconductor die 22 including a plurality of cores and other processing logic, along with internal package memory $25_0$-$25_n$. In an embodiment, in-package memory 25 may be implemented as one or more separate die formed of, e.g., DRAM. While 8 such in-package memories are shown, more or fewer may be present in a given implementation. This in-package memory is also referred to herein as multi-channel DRAM (MCDRAM), while in turn platform memory 30 may also be referred to herein as DDR DRAM. In one embodiment, in-package memory 25 may provide much higher bandwidth compared to platform memory 30 (e.g., 500 GB/s vs. 100 GB/s). In addition, this in-package memory may have a relatively large capacity in absolute terms (e.g., 16 GB).

Still with reference to FIG. 1, die 22 further includes different types of memory controller circuitry, including integrated memory controllers (IMCs) $24_0$ and $24_1$, configured to interface with corresponding portions of platform memory 30. In addition, on package input/output (OPIO) circuitry $26_0$-$26_n$ may include or be associated with additional memory controller circuitry, also referred to herein as embedded DRAM controllers (EDC), to interface with in-package memory 25. In an embodiment a caching home agent of the memory controllers may include a system address decoder and home agent that are configured to provide the ability to access two different types of memory in the same address space. As such, the processor may further include two different types of home agents to facilitate sending requests to the different memory types. Each caching home agent owns a set of memory addresses. In an embodiment, a hash function is used to determine which address is owned by which caching home agent. All accesses to a memory address go to the caching home agent that owns that address, where it is serialized as appropriate versus other accesses to the same address, e.g., for cache coherency and memory consistency purposes. The system address decoder associated with the caching home agent checks the addresses of memory accesses coming to the caching home agent and determines which address resides in MCDRAM and which in DDR. Accordingly, it directs the memory access to MCDRAM or DDR. Thus in various embodiments DDR and MCDRAM may be configured as one memory and system address decoders provide the point for selecting to which memory a request is to be directed to, using NUMA mechanisms and a software library may be used to access MCDRAM. Additionally, the library utilizes certain configuration tables to provide mechanisms to advertise the bandwidth of each memory controller. Utilizing both distance and bandwidth information, the library can provide a more robust solution.

As further illustrated, die 22 also includes multiple interfaces $28_0$-$28_1$ to interface with off-chip circuitry. As examples, interfaces 28 may include one or more Peripheral Component Interconnect Express (PCIe) interfaces and one or more direct media interfaces (DMI), although other types of interface circuitry are possible.

A high bandwidth memory allocation library may be built on top of a NUMA allocation library to allow software to allocate directly into the MCDRAM. Exposing the different memory types as separate NUMA domains can be done by providing settings in basic input/output system (BIOS) configuration tables (such as advanced configuration and power interface (ACPI)) tables and appropriate system address programming in hardware (including within the memory controllers). With this configuration, the DDR appears closer to the processor than the package-internal MCDRAM. In this way, legacy memory allocations go to DDR by default, preventing MCDRAM from being filled by irrelevant data. Of course, while these default settings make DDR appear closer to MCDRAM, a user may choose to configure it the other way instead.

Thus a programmer can explicitly allocate memory on the MCDRAM by using a high bandwidth library that has memory allocation functions analogous to legacy functions (like malloc, calloc and free). For some programming languages (e.g., FORTRAN), a keyword may be provided to enable a compiler to detect variables to be allocated to MCDRAM and to generate the high bandwidth library function call to allocate the variables in MCDRAM.

Thus two different types of memory formed as two different NUMA domains can be part of the same common address space. Note that software written to use a high bandwidth allocation library can be portable to platforms that do not have the two types of memory, because in that case the library functions will default to standard allocation routines. Using an embodiment, a programmer is provided with a simple mechanism for directly managing high bandwidth memory on a processor socket (or multiple types of memory on any other system).

Figure 2:
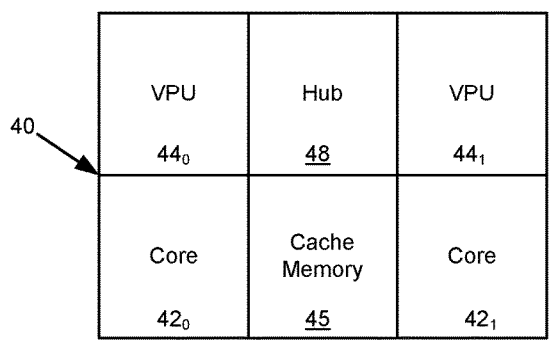
FIG. 2 is a representative tile in accordance with an embodiment.

As described above, die 22 includes a plurality of cores and other logic circuitry. More specifically, in an embodiment these cores may be arranged as tiles including various processing circuitry, cache memory, interface circuitry and so forth. Illustrated in FIG. 2 is a representative tile in accordance with an embodiment. In the embodiment of FIG. 2, tile 40 is shown to include a plurality of cores $42_0$-$42_1$, and a plurality of vector processing units $44_0$-$44_1$. In addition, tile 40 further includes a cache memory 45, and a hub 48, which acts as an interface between circuitry within tile 40 and other circuitry of the processor. In an embodiment, cores 42 may be out-of-order execution cores adapted to perform multi-threaded processing and implement a given instruction set architecture. In other embodiments, asymmetric cores, including both out-of-order and in-order execution cores may be present. Understand that each core and vector processing unit may include internal cache memory and that cache memory 45 may be a level 2 cache memory shared between the various processing circuits within a given tile. In an embodiment, hub 48 may interface with an interconnect structure of the processor, which may be a ring-based interconnect, in one example.

Note that processors as described herein may be incorporated into different platforms. For example, a bootable form-factor processor may be implemented into a motherboard-based system having large amounts of on-board memory (e.g., up to 192 GB of DDR4) and additionally including in-package MCDRAM or other high bandwidth memory (HBW) (e.g., 8-16 GB). In some embodiments, the performance of MCDRAM in this platform may have a much larger bandwidth (e.g., 4-6× higher) with similar latencies as DDR4. Other processors may be for a card form factor processor configured to only operate using the in-package MCDRAM.

Figure 3:
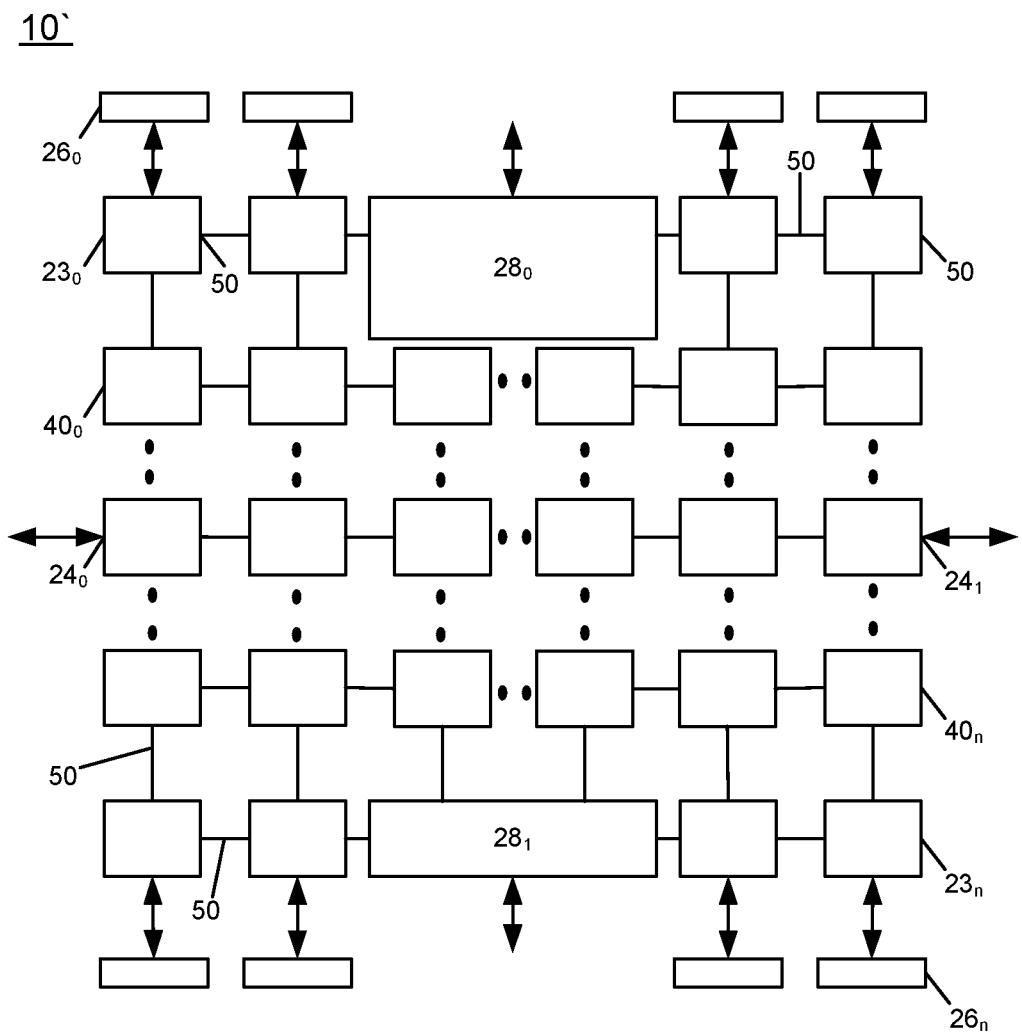
FIG. 3 is a block diagram of further details of a processor in accordance with an embodiment of the present invention.

Next referring to FIG. 3, shown is a block diagram of further details of a processor in accordance with an embodiment of the present invention. As shown in FIG. 3, processor 10' may generally correspond to processor 10 of FIG. 1. For ease of illustration however, only shown with regard to processor 10' are the actual on-die components interconnected by an interconnect network 50 (generally shown as a plurality of connections in the X and Y directions in FIG. 3). Note here the presence of a plurality of tiles $40_0$-$40_1$, each of which may be configured as described above in FIG. 2. Interconnect network 50 may be implemented as a ring, mesh or any other interconnect. Collectively, interconnect network 50 may be used to route traffic within the processor. Interconnect network 50 may have a distributed directory coherence protocol and may provide for message arbitration on packet insertion into the interconnect network and on turns between X and Y directions. In an embodiment, interconnect network 50 may provide for various cluster modes, including an all-to-all mode, a quadrant mode, and a sub-NUMA mode, as will be described further herein.

As further illustrated in FIG. 3, interconnect network 50 couples together various tiles 40, memory controllers $23_0$-$23_n$ (which are EDC memory controllers to interface with the in-package memories), memory controllers $24_0$-$24_1$ to interface with processor-external platform memory and interfaces $28_0$-$28_1$. Note that separate interconnections coupled between the various memory controllers 23 and corresponding OPIOs $26_0$-$26_n$.

Figure 4:
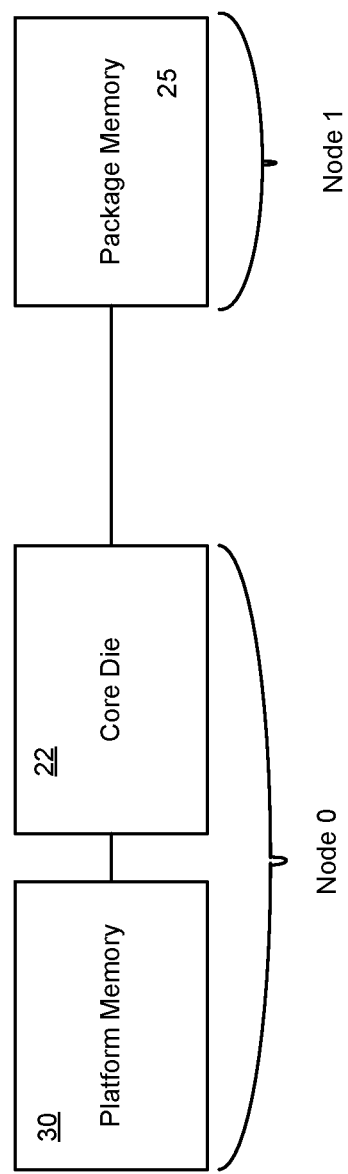
FIG. 4 is an illustration of a memory view to be provided in a system in accordance with an embodiment of the present invention.

Embodiments may enable the different memories present within a system to have a common address space. To this end, and to provide an ability for a user to specifically associate high bandwidth information for storage in the in-package memory, the different memory types may be exposed as different nodes, namely different NUMA nodes. Referring now to FIG. 4, shown is an illustration of a memory view to be provided in a system in accordance with an embodiment of the present invention. As shown in FIG. 4, a first node, node 0 associates the off-package platform memory with the processor itself (namely core die 22). A NUMA node may include one or more processors, memory, and I/O resources or any combination of these, e.g., as configured by BIOS. In different situations, the same hardware may be divided differently to generate different node topologies. In turn, in-package memory 25 may be identified as a separate node, node 1. As described herein, by presenting the NUMA nodes in this manner, OS and other lower priority memory allocations may be made to the off-chip platform memory, while high priority high bandwidth allocations by a programmer can be made to the in-package memory to enable higher bandwidth, and reduced average latencies on highly loaded systems.

In an embodiment, BIOS discovers during reset that the multiple memory types are present, e.g., based on fuse settings for MCDRAM, while DDR is discovered through querying the DDR and reading configuration information from the DDR itself. In turn, BIOS writes particular values to configuration tables (such as ACPI tables) to describe the different memory types and their characteristics. In general, these tables may be written with values to enable one of multiple memory modes, e.g., based upon a user-selectable BIOS option.

In an embodiment, the memory modes enable MCDRAM to be configured as either a cache or an addressable NUMA memory, or a combination of both. For legacy programs the cache model might be more suitable, but if a developer wants to maximize performance a program can be modified to either constrain its working set to the MCDRAM capacity or determine how best to simultaneously utilize a fast/small memory pool and a large/slower memory pool of a flat mode.

In a flat memory mode, also referred to herein as a common address space mode, one or more memory types are configured as software visible OS-managed memory or NUMA nodes. The flat model may offer higher performance, by configuring the different memory types as different NUMA nodes. In embodiments, BIOS and operating system together may configure and expose the configuration to upper level software using NUMA information and/or information within various BIOS tables. In an embodiment, BIOS tables describe the platform to the OS so that the OS can make appropriate allocations. In embodiments, DDR memory is configured to appear to be closest to all cores, with the MCDRAM memory to appear as further away. This configuration causes the OS to prefer to allocate space to DDR memory, leaving the MCDRAM unallocated and available for particular user data structures that are explicitly allocated into it, such as critical data. An example of bandwidth critical data is a structure that is likely to be frequently missed by on-die caches (e.g., L1 and L2) and also simultaneously used by the majority of cores. Large data structures that are sequentially streamed and large data structures that are randomly accessed are other examples. In general, distance information may be set to define DDR memory as being of a near node (and thus preferred for OS and default allocation), and to define MCDRAM as being of a far node for application usage.

In a cache mode, all of the MCDRAM behaves as a memory-side direct-mapped cache to act as a cache memory for the DDR, so there is only a single visible pool of memory. In an embodiment, to configure cache mode, BIOS may select the flat memory model, and then select "all" as the amount of MCDRAM to use as cache.

Yet another memory mode is a hybrid model, in which some amount of MCDRAM is configured as an addressable memory, and some amount of MCDRAM is configured as a cache. For example, with 16 GB of in-package memory, 8 or 12 GB can be configured as in-package memory of a common address space, and the remaining 8 or 4 GB configured as cache memory. Note that the hybrid model still supports the full bandwidth of all the channels of MCDRAM. In a hybrid model, each MCDRAM device can be subdivided. To configure a system for hybrid mode in the BIOS, NUMA mode is enabled, hybrid memory model is selected, along with the amount of MCDRAM to be cache. The hybrid model looks the same as the flat model to software (there are multiple NUMA domains), except that there is a memory-side cache memory exposed.

Figure 5:
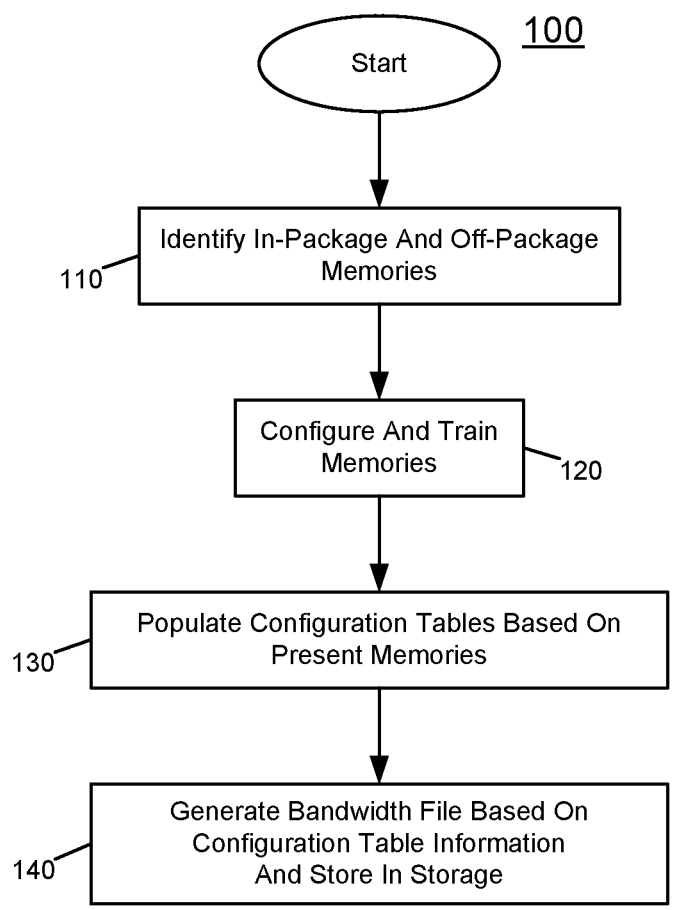
FIG. 5 is a flow diagram of a method in accordance with an embodiment of the present invention.

Referring now to FIG. 5, shown is a flow diagram of a method in accordance with an embodiment of the present invention. As shown in FIG. 5, method 100 is a memory configuration method which may be performed, e.g., on system boot to identify available memories and to appropriately program the memories to enable their use during system operation. In an embodiment, method 100 may be performed by a processor or other hardware logic of a system during boot operation of a system, e.g., responsive to BIOS instructions. Of course understand that memory configuration may occur responsive to other entities in different embodiments.

As seen, method 100 begins by identifying in-package and off-package memories (block 110). In an embodiment, configuration logic of a processor may issue resource requests to such memories to identify their presence and determine basic information regarding the memories. Next, control passes to block 120 where the memories may be configured and trained. In an embodiment, configuration of the memory may include providing certain identification information to the memories themselves, as well as programming address information regarding the memories in an associated memory controller (which in an embodiment may include a system address decoder and other such hardware). In addition, configuration tables may be populated based on the present memories. As an example, BIOS may populate certain BIOS tables, including ACPI tables. Certain of these BIOS tables may be programmed to provide memory bandwidth information, distance information and so forth. In one embodiment, a first table is written with values that describe MCDRAM as a (memory-only) NUMA node. In one embodiment, a second table is written with distance values that cause the MCDRAM NUMA node to appear to be at a further distance from a compute node than from a DDR NUMA node. By this programming of these configuration tables, during application execution, memory allocation by default occurs to the DDR memory, thereby keeping MCDRAM available for important data. More specifically, by this configuration, the MCDRAM NUMA node may be allocated explicitly by one or more high bandwidth library functions. In one embodiment, a third table is written with values that describe bandwidth characteristics of the MCDRAM node and the DDR node so that MCDRAM can be identified by the high bandwidth library functions.

Still with reference to FIG. 5, at block 140 a bandwidth file may be generated based on the information present in at least one of the configuration tables. Thus to appropriately configure a system to leverage these multiple memory types, a boot program is provided that runs at the time of OS boot. This program parses at least the third table and writes bandwidth characteristics of each NUMA node in a file in the file system accessible, e.g., to boot program and memory allocation libraries. In turn, this file may be accessed by the high bandwidth library function, which uses this information during high bandwidth memory allocation. Note that such boot program may be used in cases where a given OS (e.g., a Linux operating system) does not parse certain configuration tables. In other cases, where a given OS parses this table, the boot program may be avoided. Understand while shown at this high level in the embodiment of FIG. 5, many variations and alternatives are possible.

Figure 6:
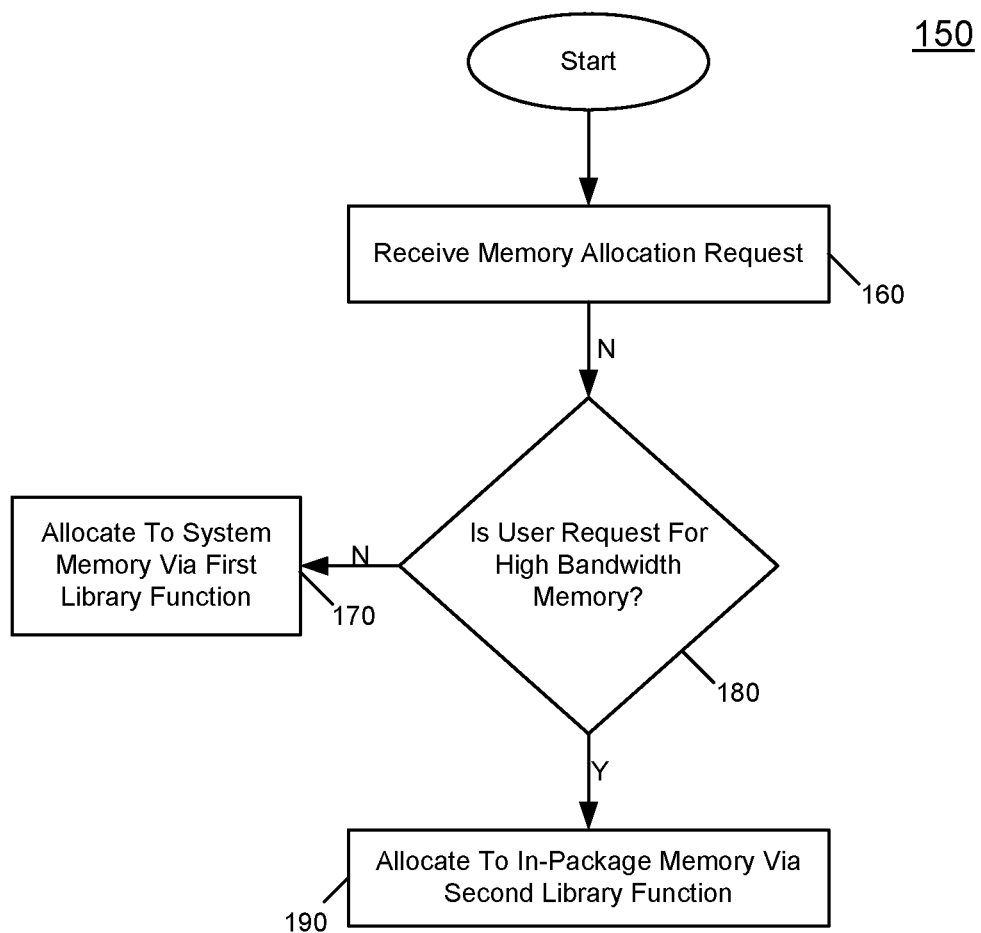
FIG. 6 is a flow diagram of a method in accordance with another embodiment of the present invention.

Referring now to FIG. 6, shown is a flow diagram of a method in accordance with another embodiment of the present invention. As shown in FIG. 6, method 150 may be a memory allocation method performed during application execution. As seen, method 150 begins by receiving a memory allocation request (block 160). For a user request (e.g., responsive to a programmer-initiated memory allocation request), control passes to diamond 180 where it can be determined whether this user request is for high bandwidth memory. That is, in situations where the user is aware of the presence of high bandwidth in-package memory, a request for a memory allocation of this high bandwidth memory may be explicitly made. In this case, control passes to block 190 where the memory allocation request may be allocated to the in-package platform memory via a second memory library function. For example, a HBW MALLOC library function may be used to allocate the requested amount of memory within the in-package memory. Otherwise, if the user request is not for high bandwidth memory, control passes to block 170 where the memory allocation request may be allocated to the off-chip platform memory via a first memory library function. For example, a MALLOC library function may be used to allocate the requested amount of memory within the platform memory as described above.

Note that low bandwidth allocations can be handled out of the off-package memory to thus reserve the in-package memory for higher bandwidth/user requested allocations. An OS can manage both the package memory and platform memory using a NUMA subsystem. All memory requests, regardless of type, go to the OS. In an embodiment, an application chooses to call "malloc" or "hbw_malloc". Note that even OS-sourced requests can go to MCDRAM if the DDR capacity is exhausted; DDR may be a preferred memory type for the OS, and everything else by default. Applications also implicitly use MCDRAM when DDR capacity is exhausted. Even MCDRAM allocation requests can go to DDR when MCDRAM is exhausted, with the default policy (which can be overridden). Note the OS uses a lower level of memory allocation routines (below "malloc" and "hbw_malloc"). For memory allocations, preference is first to provide local memory (memory in the same node) and then to the rest of memory based upon how long it takes the processor to access it. The closer the memory is, the higher the preference. Understand while described at this high level in the embodiment of FIG. 6, many variations and alternatives are possible.

In an embodiment, a high bandwidth library contains memory allocation functions that are generally analogous to standard memory allocation functions. These functions use the NUMA allocation functions, provided as part of an OS, to allocate memory on a given NUMA node, in this case to allocate memory on the MCDRAM node.

Table 1 below shows the example of a malloc( ) function replaced by a hbw_malloc( ) the analogous function from the high bandwidth library, to allocate memory on MCDRAM instead of DDR. In an example embodiment, the code transformation of Table 1 may be used to allocate memory to MCDRAM in a C language application.

TABLE 1

| Allocate in DDR | float | *fv; |
| | fv = (float *)malloc(size of(float) * 1000); | |
| Allocate in MCDRAM | float | *fv; |
| | fv = (float *)hbw_malloc(size of(float) * 1000); | |

Table 2 shows a code example of how memory can be allocated on MCDRAM in a Fortran language application. In this example, a compiler attribute called FASTMEM may be present. When this attribute is applied to an array, the compiler generates hbw_*( ) call for that array to allocate it in MCDRAM. Thus in this example, use of FASTMEM attribute in Fortran allocates array "A" in MCDRAM. Such allocation may be used for allocatable arrays in Fortran. For static arrays, linker and loader support may be provided.

TABLE 2

| c | Declare arrays to be dynamic |
| | REAL, ALLOCATABLE : : A(:), B(:), C(:) |
| !DEC$ ATTRIBUTES, FASTMEM : : A | |
| | NSIZE=1024 |
| | allocate array 'A' from MCDRAM |
| | ALLOCATE (A(1:NSIZE)) |
| | Allocate arrays that will come from DDR |
| | ALLOCATE (B(NSIZE), C(NSIZE) ) |

Table 3 below provides a listing of high bandwidth library functions in accordance with one embodiment of the present invention.

TABLE 3

```
int hbw_check_available(void);
   void* hbw_malloc(size_t size);
   void* hbw_calloc(size_t nmemb, size_t size);
   void* hbw_realloc (void *ptr, size_t size);
   void hbw_free(void *ptr);
   int hbw_posix_memalign(void **memptr, size_t alignment, size_t size);
   int hbw_posix_memalign_psize(void **memptr, size_t alignment, size_
t size, int pagesize);
   int hbw_get_policy(void);
   void hbw_set_policy(int mode);
```

These functions use NUMA library functions to allocate memory on a specified NUMA node.

For purposes of static memory allocations, a keyword, called FASTMEM, may be recognized by a compiler. Variables that are to be placed in MCDRAM are tagged with this keyword. In turn, the compiler passes these keywords to the linker, which gathers the tagged variables into a separate data segment. In turn, the loader then loads that data segment into MCDRAM.

If the developer is using C, a NUMA API may be used, via an abstracted memory allocation function that performs its own HBW discovery. C++ developers can also utilize the NUMA API, but code changes may be dictated where there is reliance on "new" for all their memory allocations. In some embodiments for C++ "new" can be overridden at a global level or at the class level.

Figure 7:
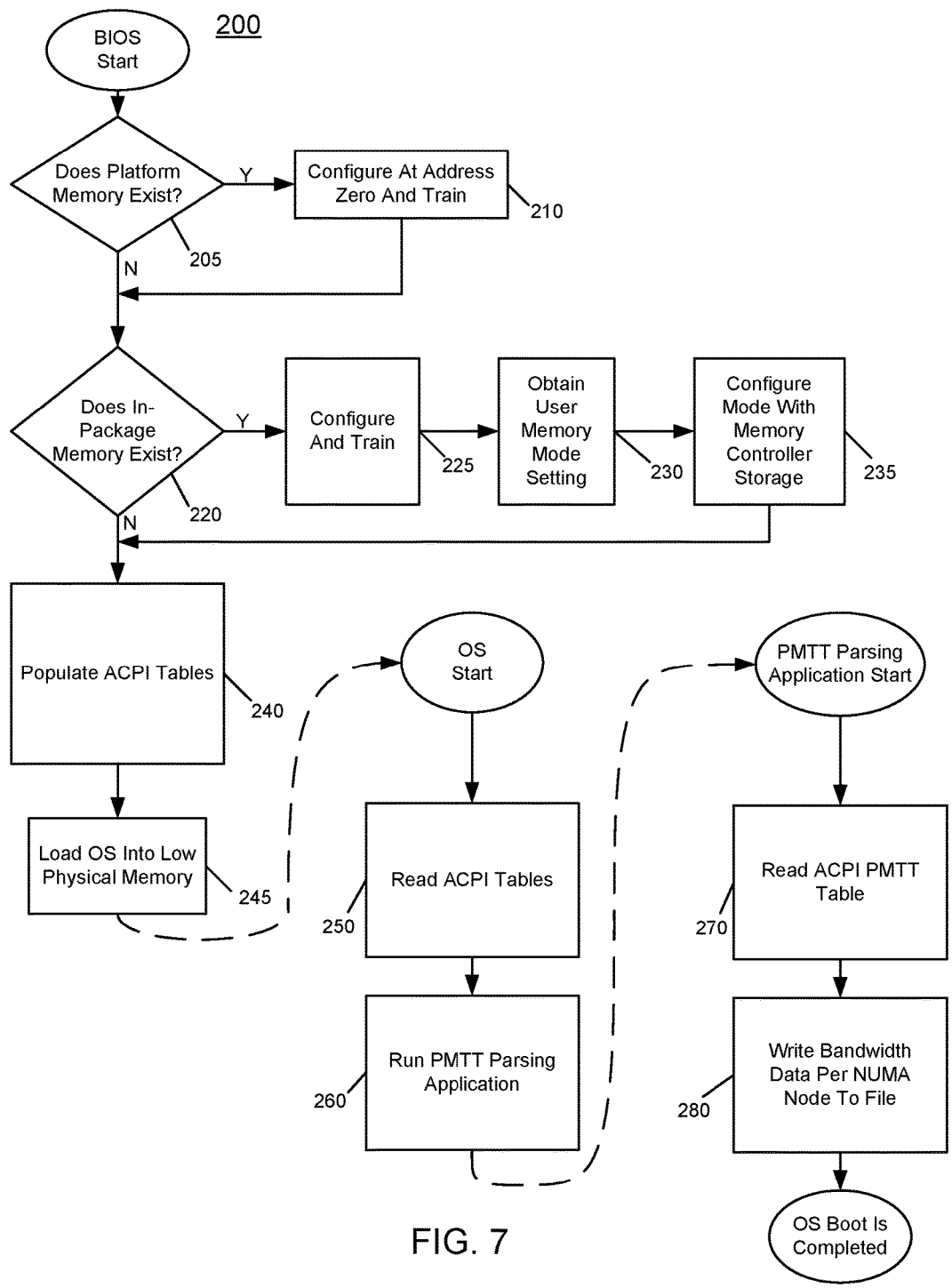
FIG. 7 is a flow diagram of a method in accordance with another embodiment of the present invention.

Referring now to FIG. 7, shown is a flow diagram of a method in accordance with another embodiment of the present invention. In the embodiment of FIG. 7, method 200 illustrates various operations performed during boot to accommodate multiple different memory types of a system as a single common address space as described herein. As seen, method 200 begins during BIOS execution where it is determined whether a platform memory is present (diamond 205). Note that depending on a particular type of platform in which an SoC including in-package memory is included, it is possible that platform memory in the form of off-package DRAM may not be present. In the case in which such memory is present, control passes to block 210 where the platform memory may be configured at address 0 and appropriately trained, otherwise in-package memory may be configured at address 0.

Next it is determined at diamond 220 whether in-package memory exists. If so, at block 225 this in-package memory is configured and trained (at address 0 if there is no off-package memory). Thereafter, control passes to block 230 where a user memory mode setting may be obtained. In different embodiments, such in-package memory may be operated in different modes including, in one embodiment a cache mode in which the in-package memory acts solely as a cache memory; a NUMA mode in which the in-package memory acts as a separate NUMA mode, and a hybrid mode in which at least a portion of the in-package memory is reserved to be a cache memory and at least another portion is reserved to be a NUMA mode. The selected memory mode may be stored, e.g., in a memory controller configuration storage (block 235).

Still with reference to FIG. 7, thereafter various BIOS tables, including ACPI tables may be populated (block 240). In an embodiment, information regarding the memory structure of the platform may be populated into various tables. A platform software abstraction layer such as ACPI may contain various tables and procedures (called methods), that the BIOS and operating system can invoke. In an embodiment, BIOS publishes 3 different configuration tables for the OS. A system locality distance information table (SLIT) provides a matrix that describes the relative distance (memory latency) between all system localities, which are also referred to as proximity domains. In an embodiment, the SLIT table describes 2 system localities, with the MCDRAM as always further away in a memory-only node (distance of 21) to all nodes, while the distance to DDR may be listed at 10 (self-distance). This is so, even though in all cases, the in-package memory is physically closer to all cores than any package-external platform memory (and the in-package memory is also to communicate with the cores at higher bandwidth than platform memory).

In turn, a system resource affinity table (SRAT) describes the physical location of processors and memory relative to each other; this allows the OS to group threads and memory in an optimal manner. This is the table that defines ACPI proximity domains, or what the OS calls NUMA nodes. In turn, a platform memory topology table (PMTT) contains both bandwidth and latency information. The bandwidth (e.g., read and write bandwidth) and latency information can be used to identify MCDRAM, in an embodiment.

Still with reference to FIG. 7, control next passes to block 245 where the OS may be loaded into low physical memory. In the case in which platform memory is present, the OS may be loaded into this off-package platform memory, when present. At this point OS boot operations begin at block 250 where the populated ACPI tables are read. Thereafter at block 260, in a particular OS implementation in which the PMTT table is not read as part of the OS boot process, a PMTT parsing application in accordance with an embodiment may be executed. Note that in other cases, the operations performed by the PMTT parsing application may be implemented as part of OS boot in cases where the OS reads the PMTT table as part of its boot process.

In any case, with further reference to FIG. 7, the PMTT parsing application begins at block 270 where the PMTT table is read. From the information present in this table, bandwidth data may be written to a file accessible to the library. The information to be stored in this file may include, in an embodiment, bandwidth information per each NUMA node present in the system (block 280). Thus at this point the various memories of a single address space of a platform are appropriately configured, trained and ready for normal operation. Understand while shown at high level in the illustration of FIG. 7, many variations and alternatives are possible.

Figure 8:
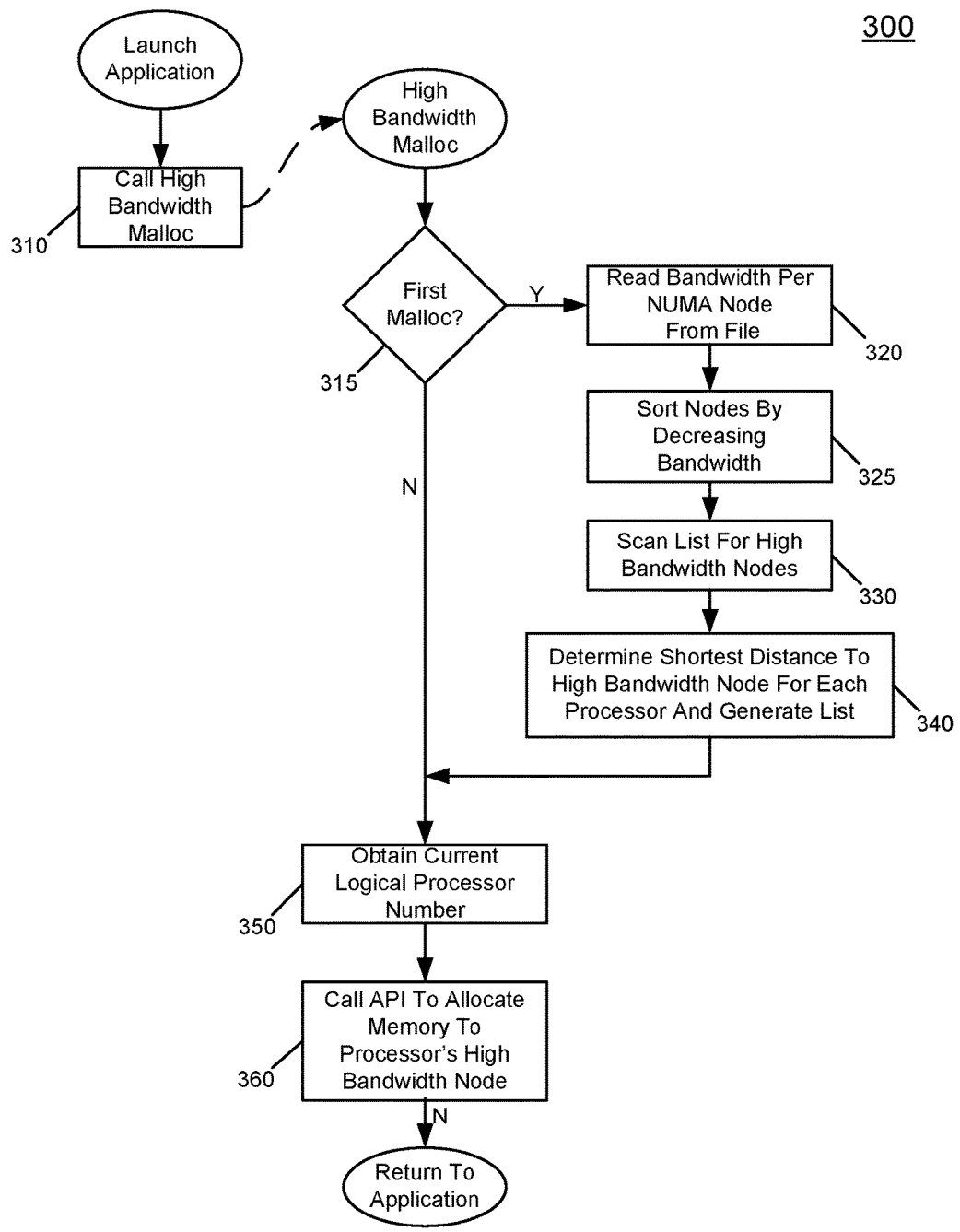
FIG. 8 is a flow diagram of a memory allocation method in accordance with an embodiment of the present invention.

Now with reference to FIG. 8, shown is a flow diagram of a memory allocation method in accordance with an embodiment of the present invention. As shown in FIG. 8, method 300 may be performed during an application launch in which requested memory is to be allocated. As seen, assume that the application seeks allocation of high bandwidth memory by programmer request. In an embodiment, a programmer may call a high bandwidth memory allocation library function (referred to herein as HBW MALLOC) for such memory allocation (block 310). As seen, this memory allocation operation is performed through a series of operations.

First, it is determined whether this memory allocation request is the first MALLOC performed (diamond 315). If so, control passes to block 320 where the bandwidth per NUMA node may be read from the file generated as described above. From the information obtained regarding bandwidth, the nodes may be sorted, e.g., by decreasing bandwidth (block 325). From this list of nodes and their bandwidth, the high bandwidth nodes within the list may be identified (block 330). Thereafter at block 340 the shortest distance to each high bandwidth node may be determined for each processor and a list of such distance information (also referred to herein as affinity information) may be determined (block 340). In an embodiment, an affinity table generated from this information may be stored.

With further reference to FIG. 8, control passes to block 350 where a current logical processor number may be obtained. That is, each core of an SoC may include one or more logical processors. At block 360 an application programming interface (API) may be called to allocate memory to this processor's high bandwidth node. This API in an embodiment may be a NUMA API. Thus method 300 concludes and control returns to the application with appropriate collections of high bandwidth memory. Understand while described at this high level in the embodiment of FIG. 8, many variations and alternatives are possible.

Embodiments may further be used in interactions with NUMA clusters. For example, a processor may be configured with a clustering mode, called sub-NUMA clusters (SNC), in which a set of processor cores is segmented (e.g., virtually) into a plurality of clusters, each of which is a NUMA domain. In one embodiment, a processor may be configured for 4 cluster segmentation. In any configuration of clustering, the flat MCDRAM mode can extend the number of NUMA nodes (e.g., doubling) by appropriate selection of the distances in a given one or more configuration tables (e.g., a SLIT table) to describe the affinity between the different nodes. SNC may be available in a given processor to further optimize bandwidth, latency, and power. As examples, SNC can enable a processor to be subdivided into two or four partitions. In an embodiment, each node including one or more cores can have two dedicated MCDRAM channels and additionally share multiple DDR channels (e.g., 3) among two nodes. In a 4 partition topology, there are 8 NUMA nodes because each of the memory types has been multiplied by 4, as shown in FIG. 9.

Figure 9:
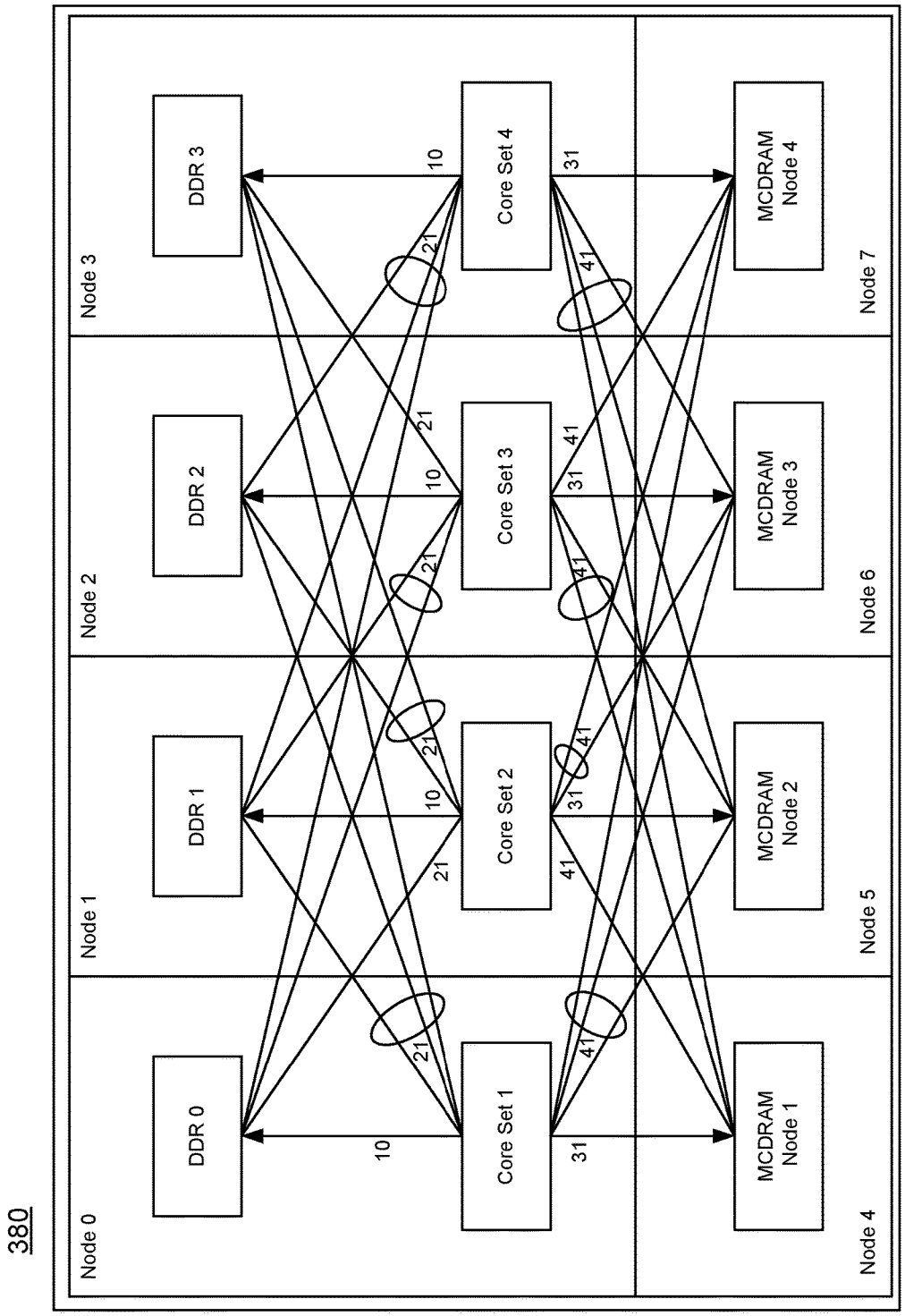
FIG. 9 is a block diagram of a plurality of nodes of a system in accordance with an embodiment of the present invention.

Referring now to FIG. 9, shown is a block diagram of a plurality of nodes of a system 380 in accordance with an embodiment of the present invention. In the illustration shown, 8 nodes are present. Nodes 0-3 correspond to a first set of NUMA nodes each including one or more cores and an associated portion of an off-package platform memory, namely DDR0-DDR3. As seen, a distance or affinity is associated with each linking between core set and node-internal memory. Specifically, an affinity value of "10" identifies the configured distance between cores and memory within a single node. Note that in some cases, a distance of "10" as shown in FIG. 9 is implied, and is listed in the tables (referred to as a self-distance). For the system memories associated with the other core-included nodes, a different distance is present, namely a distance of 21.

Instead, to ensure that the in-package memory appears further away from the cores than the off-package memory (at least to the view of unaware software including an OS), a greater affinity or distance identifies the link between the cores of a set and an associated in-package memory. In the embodiment shown, this distance is 31. And further, the corresponding affinity or distance to more remote-in-package memories is 41. Understand while shown with these particular affinity values in the embodiment of FIG. 9, different such values may be present in other embodiments and the illustration is used to show that an OS and other unaware software may view off-package memory as more closely associated with a given core than an in-package memory, thus freeing the in-package memory for use by an application aware of the actual memory configuration of the system.

In an embodiment, there are 3 different BIOS setup options provided for a platform to choose memory model, cache partitioning, and on-die cluster mode. The following Table 4 shows the setup options and possible choices for a platform in one example. Note that in some embodiments only certain combinations of these options are legal and supported, which can be enforced by BIOS.

TABLE 4

Memory Model: Cache/Flat/Hybrid
Default: Cache
MCDRAM Cache Partitioning: Select From Available Partition Sizes
Default: ALL
Cluster Mode: All2All/Quadrant/SNC
Default: Quadrant In an embodiment, BIOS automatically enables NUMA if flat or hybrid is selected and disables NUMA if cache mode is selected. Any combination of "Memory Model" and "Cluster Mode" is allowed.

Embodiments thus provide a NUMA capability to be able to couple two types of memory in the same memory space and allow software to manage the two types of memory in a portable manner. In addition, embodiments enable software to fully exploit the high bandwidth of a memory system by directly managing what information is allocated to the MCDRAM memory.

Figure 10:
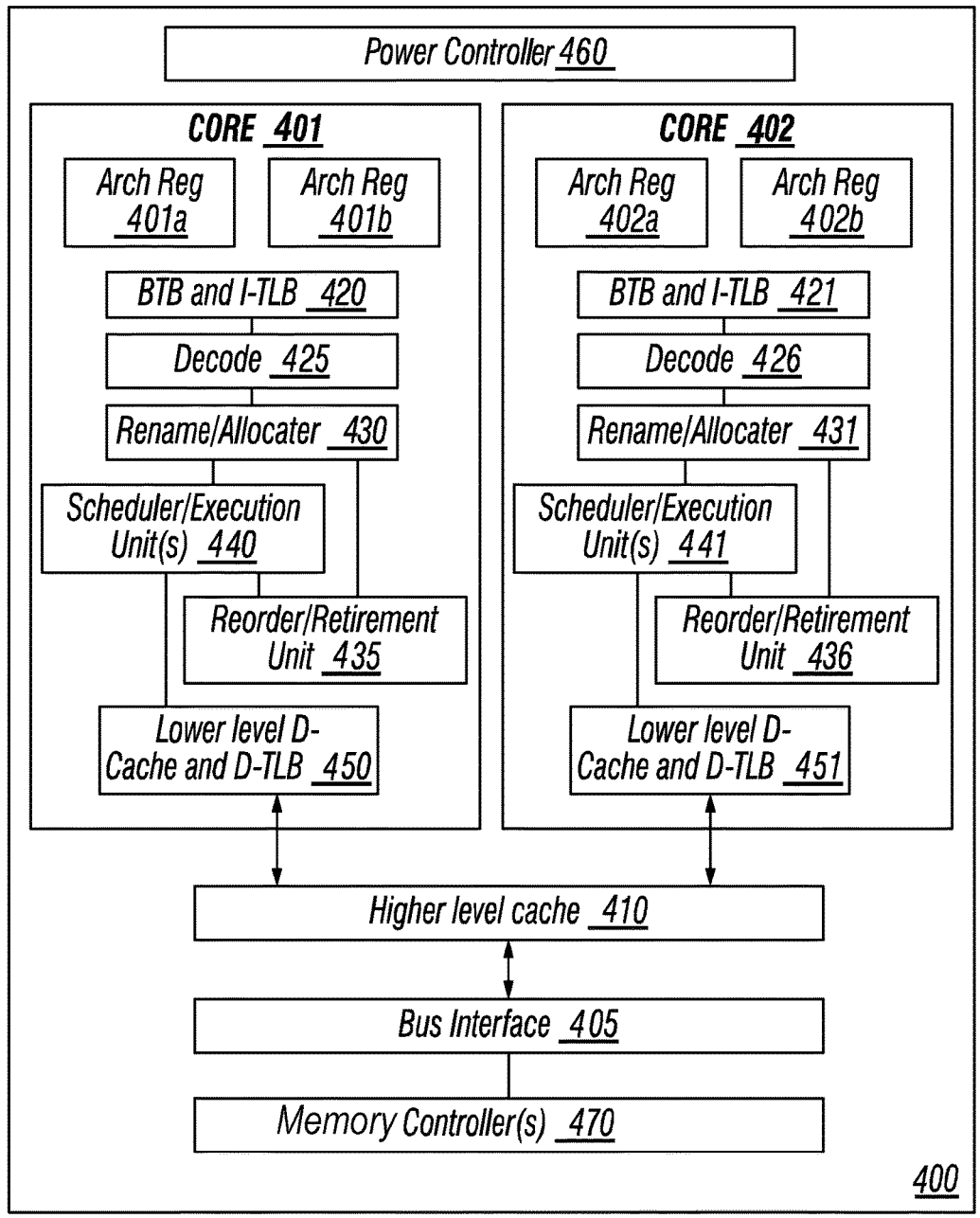
FIG. 10 is an embodiment of a processor including multiple cores.

Referring to FIG. 10, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 10, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 11:
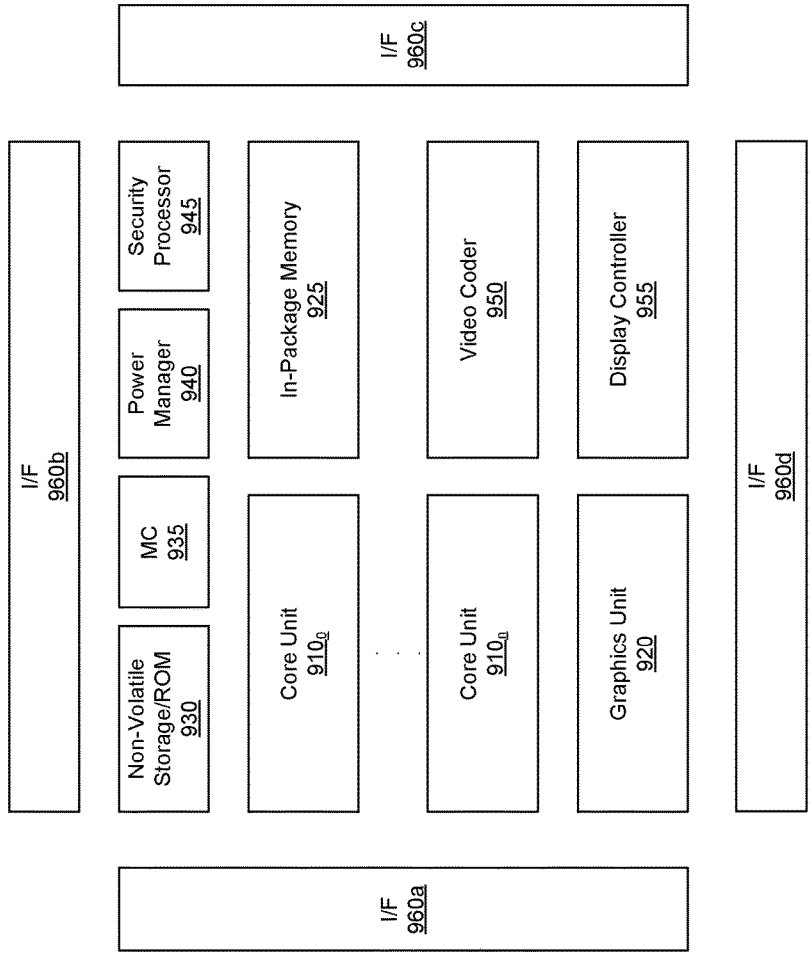
FIG. 11 is a block diagram of a processor in accordance with another embodiment of the present invention.

Referring now to FIG. 11, shown is a block diagram of a processor in accordance with another embodiment of the present invention. In the embodiment of FIG. 11, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 11, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 11). Memory controller 935 may further be configured to interface with one or more in-package memories 925, as described herein.

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present.

Other accelerators also may be present. In the illustration of FIG. 11, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth. Each of the units may have its power consumption controlled via a power manager 940, which may include control logic to perform various power management techniques.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 11, understand the scope of the present invention is not limited in this regard.

Figure 12:
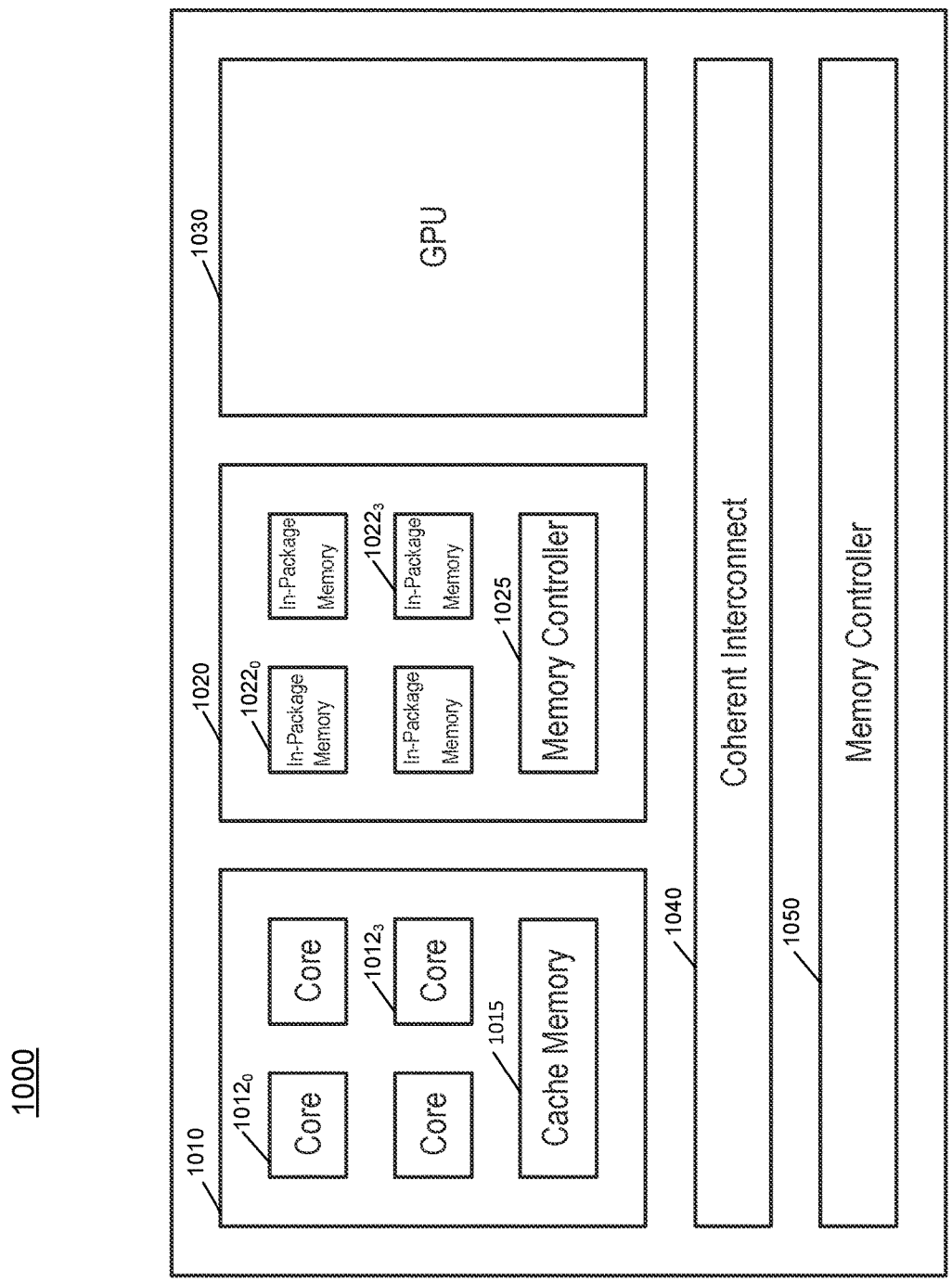
FIG. 12 is a block diagram of a representative SoC in accordance with an embodiment of the present invention.

Referring now to FIG. 12, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 12, SoC 1000 includes a first core domain 1010 having a plurality of cores $1012_0$-$1012_3$. In an example, these cores may be low power cores such as in-order cores and/or higher power out-of-order cores. In one embodiment these cores may be implemented as combinations of ARM Cortex A53 cores and/or ARM Cortex A57 cores. In turn, these cores couple to a cache memory 1015 of core domain 1010. In addition, SoC 1000 includes a memory domain 1020 including a plurality of in-package memories $1022_0$-$1022_3$ and a memory controller 1025.

With further reference to FIG. 12, a graphics domain 1030 also is provided, which may include one or more graphics processing units (GPUs) configured to independently execute graphics workloads, e.g., provided by one or more cores of core domain 1010. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-package memory, such as multiple channels of a DRAM (not shown for ease of illustration in FIG. 12).

In different examples, the number of the cores and core domains may vary. For example, for a low power SoC suitable for incorporation into a mobile computing device, a limited number of core domains may be present. Still further, in such low power SoCs, fewer numbers of higher power cores may be present. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 13:
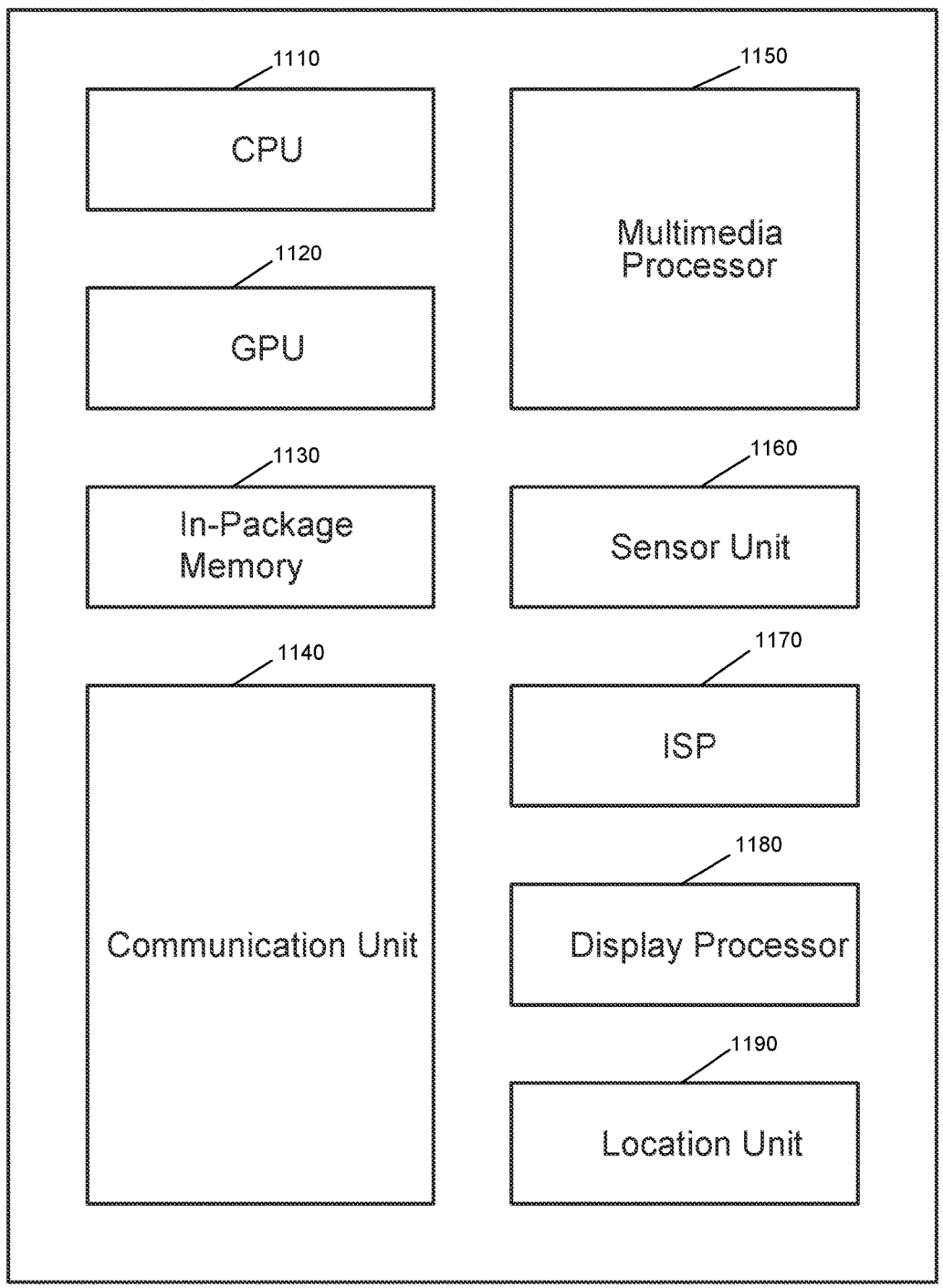
FIG. 13 is a block diagram of another example SoC in accordance with an embodiment of the present invention.

Referring now to FIG. 13, shown is a block diagram of another example SoC. In the embodiment of FIG. 13, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. An in-package memory 1130 may be provided and implemented as described herein. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 13, many variations and alternatives are possible.

Figure 14:
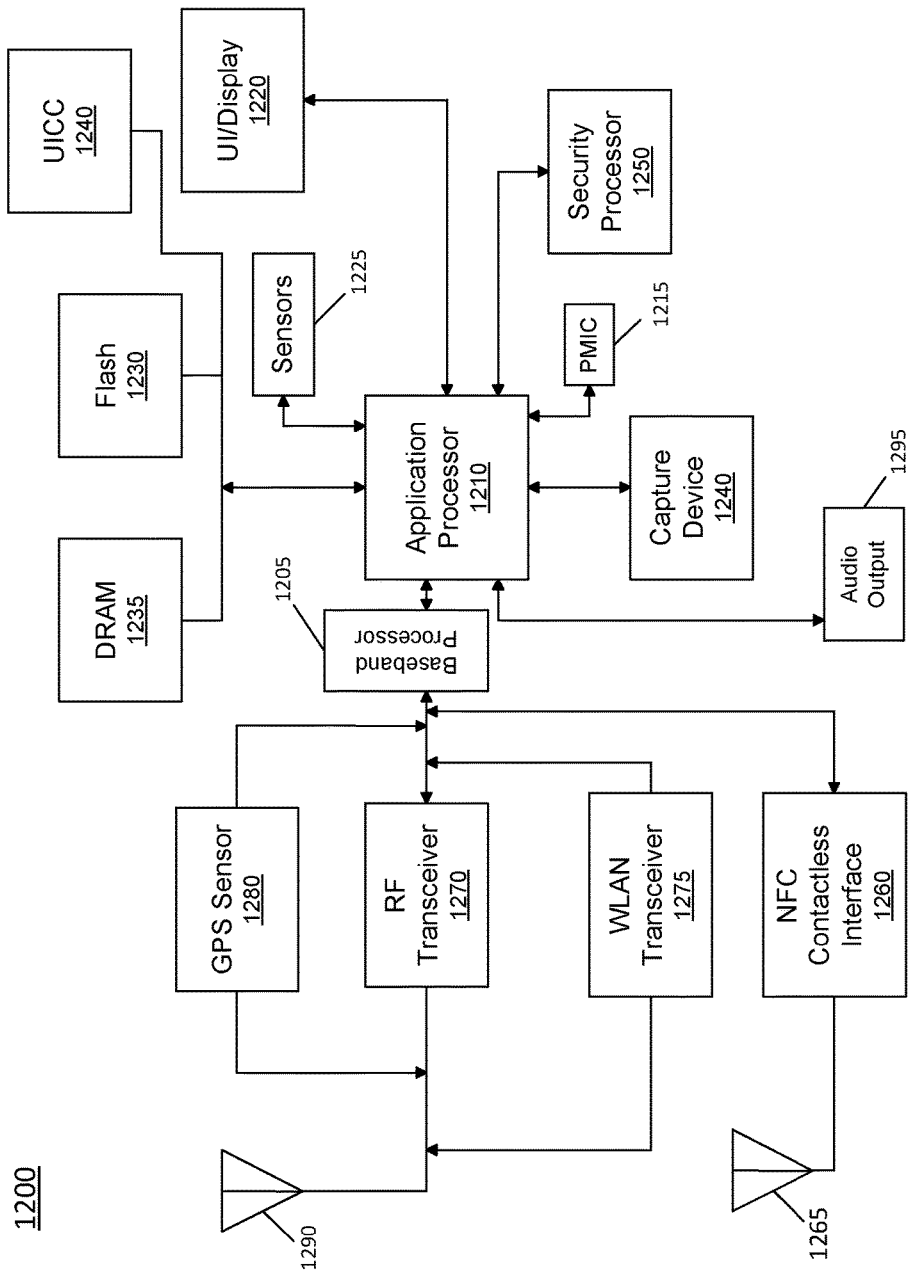
FIG. 14 is a block diagram of an example system with which embodiments can be used.

Referring now to FIG. 14, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device and may include in-package memory as described herein.

In turn, application processor 1210 can couple to a user interface/display 1220, e.g., a touch screen display. In addition, application processor 1210 may couple to a memory system including a non-volatile memory, namely a flash memory 1230 and a platform memory, namely a dynamic random access memory (DRAM) 1235. As further seen, application processor 1210 further couples to a capture device 1240 such as one or more image capture devices that can record video and/or still images.

Still referring to FIG. 14, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 14, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 15:
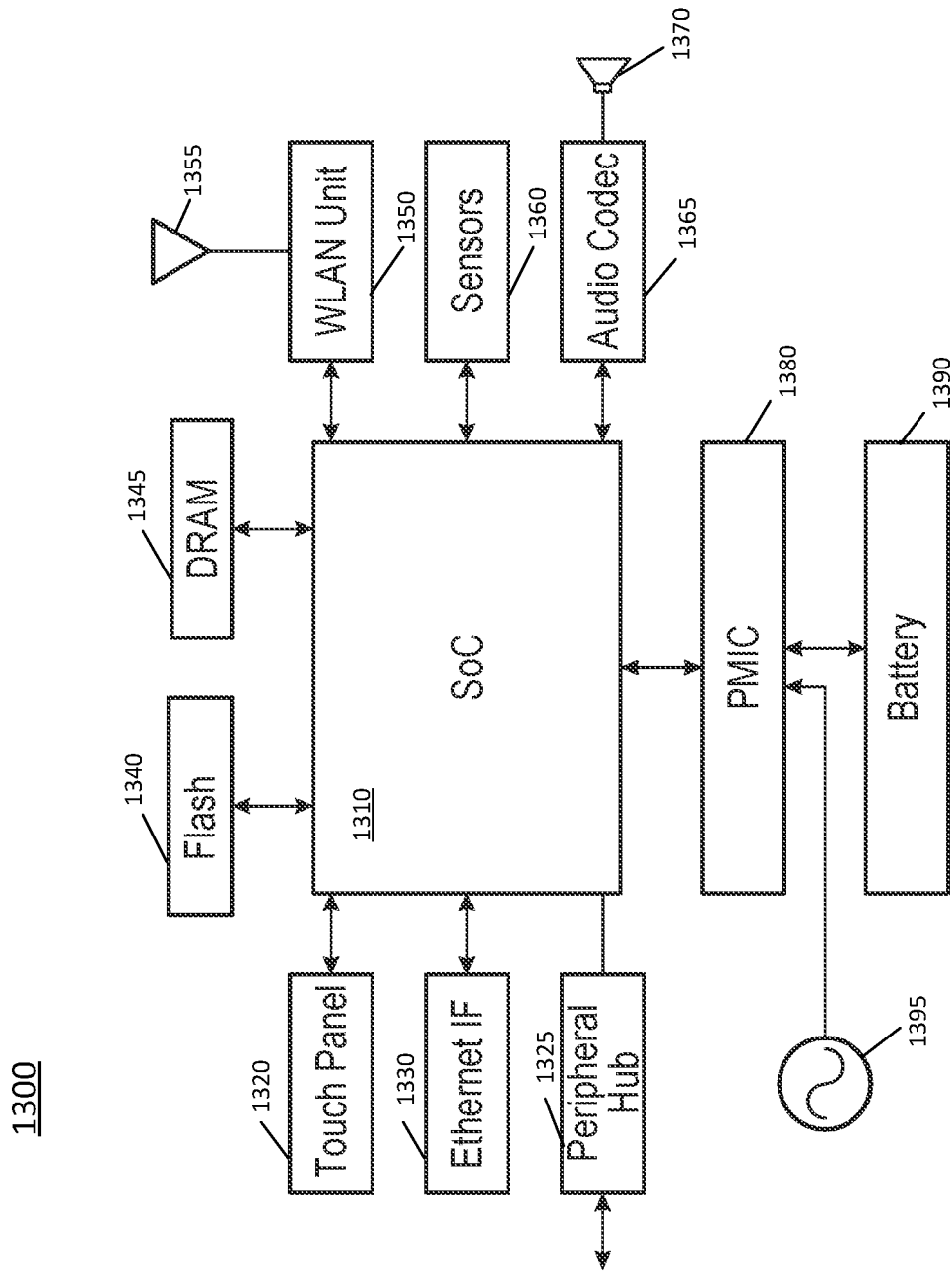
FIG. 15 is a block diagram of another example system with which embodiments may be used.

Referring now to FIG. 15, shown is a block diagram of another example system with which embodiments may be used. In the illustration of FIG. 15, system 1300 may be a mobile low-power system such as a tablet computer, 2:1 tablet, phablet or other convertible or standalone tablet system. As illustrated, a SoC 1310 is present and may be configured to operate as an application processor for the device, and may include in-package memory as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 15, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 15, many variations and alternatives are possible.

Figure 16:
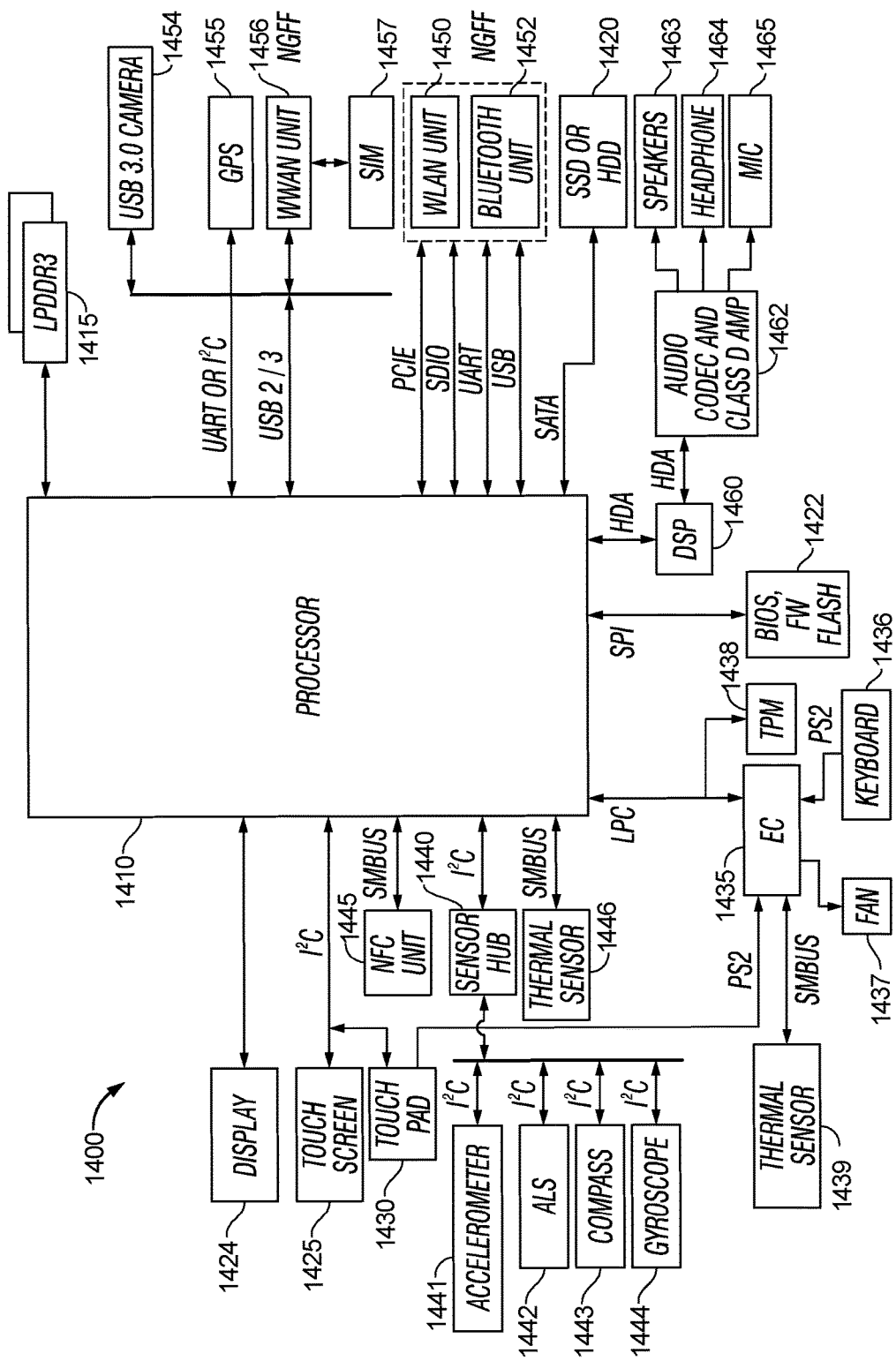
FIG. 16 is a block diagram of a representative computer system.

Referring now to FIG. 16, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC and may include in-package memory.

Processor 1410, in one embodiment, communicates with a platform memory 1415. As an illustrative example, the platform memory 1415 is implemented via multiple memory devices or modules to provide for a given amount of platform memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 16, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 16 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 16, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 16, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 16, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 16, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 16, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 16, understand the scope of the present invention is not limited in this regard.

Figure 17:
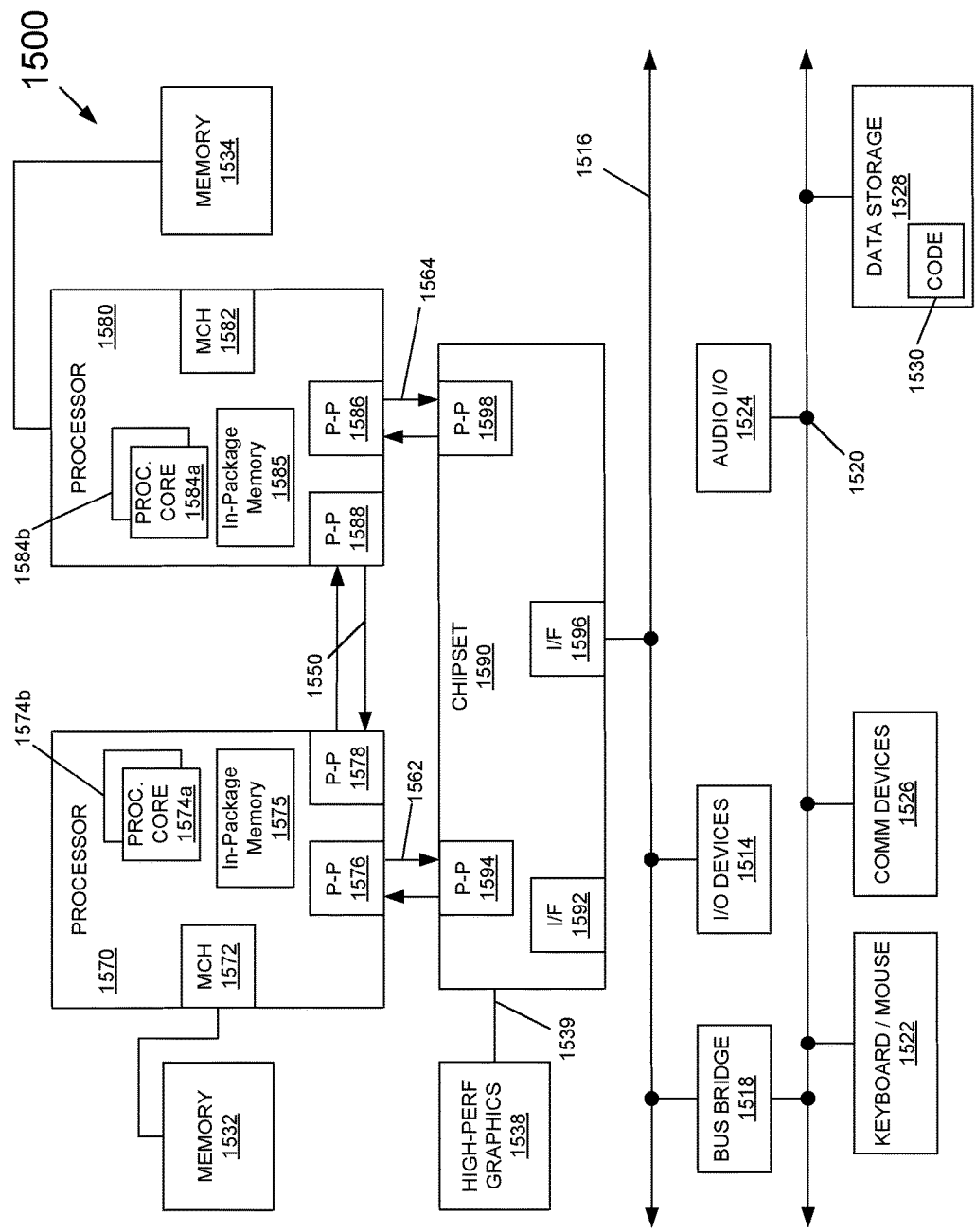
FIG. 17 is a block diagram of a system in accordance with an embodiment of the present invention.

Embodiments may be implemented in many different system types. Referring now to FIG. 17, shown is a block diagram of a system in accordance with an embodiment of the present invention. As shown in FIG. 17, multiprocessor system 1500 is a point-to-point interconnect system, and includes a first processor 1570 and a second processor 1580 coupled via a point-to-point interconnect 1550. As shown in FIG. 17, each of processors 1570 and 1580 may be multicore processors, including first and second processor cores (i.e., processor cores 1574a and 1574b and processor cores 1584a and 1584b), although potentially many more cores may be present in the processors. Each processor may also include in-package memory 1575 and 1585, as described herein. Each of the processors can also include a PCU or other power management logic to perform processor-based power management.

Still referring to FIG. 17, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 17, MCH's 1572 and 1582 couple the processors to respective memories, namely a memory 1532 and a memory 1534, which may be portions of platform memory (e.g., DRAM) locally attached to the respective processors. First processor 1570 and second processor 1580 may be coupled to a chipset 1590 via P-P interconnects 1562 and 1564, respectively. As shown in FIG. 17, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 17, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following examples pertain to further embodiments.

In one example, a processor comprises: at least one core formed on a die to execute instructions; a first memory controller to interface with an in-package memory; a second memory controller to interface with a platform memory to couple to the processor; and the in-package memory located within a package of the processor, where the in-package memory is to be identified as a more distant memory with respect to the at least one core than the platform memory.

In an example, a first distance indication is to be associated with the in-package memory and a second distance indication is to be associated with the platform memory, where the second distance indication is to indicate that the platform memory is closer to the at least one core than the in-package memory.

In an example, the processor further comprises: a first node including the at least one core and a first portion of the platform memory; a second node including at least one other core formed on the die and a second portion of the platform memory; a third node including a first portion of the in-package memory; and a fourth node including a second portion of the in-package memory.

In an example, the at least one core is to link to the first portion of the platform memory with the second distance indication, and the at least one other core is to link to the first portion of the in-package memory with the first distance indication.

In an example, the processor further comprises a first storage to store a first table having a plurality of entries to identify bandwidth associated with the in-package memory and the platform memory.

In an example, a bandwidth between the at least one core and the in-package memory is greater than a bandwidth between the at least one core and the platform memory.

In an example, the in-package memory and the platform memory are to share a common address space, the in-package memory and the platform memory comprising a non-uniform memory architecture.

In an example, the processor further comprises: a first system address decoder to associate a first portion of a common address space with the platform memory; and a second address decoder to associate a second portion of the common address space with the in-package memory.

In an example, the second memory controller is to enable at least a portion of an OS to be stored in the platform memory and the first memory controller is to enable user defined information of an application to be stored in the in-package memory.

Note that the above processor can be implemented using various means.

In an example, the processor comprises a SoC incorporated in a user equipment touch-enabled device.

In another example, a system comprises a display and a memory, and includes the processor of one or more of the above examples.

In an example, a method comprises: identifying a first node including one or more cores of a processor package and at least a portion of a platform memory coupled to the processor package and associating a first distance between the one or more cores and the at least portion of the platform memory; and identifying a second node including at least a portion of an in-package memory of the processor package and associating a second distance between the one or more cores and the at least portion of the in-package memory, where the second distance is greater than the first distance, the one or more cores and the in-package memory internal to the processor package and the at least portion of the platform memory external to the processor package.

In an example, the method further comprises populating one or more configuration tables with information regarding the platform memory and the in-package memory.

In an example, the one or more configuration tables comprises a PMTT including bandwidth information for the platform memory and the in-package memory.

In an example, the method further comprises generating a bandwidth file based at least in part on the bandwidth information in the PMTT.

In an example, the method further comprises setting the at least portion of the platform memory to a base address of a single address space including the at least portion of the platform memory and the in-package memory.

In an example, the method further comprises: receiving a first memory allocation request and allocating a range within the at least portion of the platform memory responsive thereto; and receiving a second memory allocation request and allocating a range within the at least portion of the in-package memory responsive thereto.

In an example, the method further comprises: in a first memory mode, maintaining the in-package memory to be a cache memory for the platform memory; in a second memory mode, providing a single address space formed of the platform memory and the in-package memory; and in a third memory mode, maintaining a first portion of the in-package memory to be the cache memory for the platform memory, and maintaining a second portion of the in-package memory to form the single address space with the platform memory.

In another example, a computer readable medium including instructions is to perform the method of any of the above examples.

In another example, a computer readable medium including data is to be used by at least one machine to fabricate at least one integrated circuit to perform the method of any of the above examples.

In another example, an apparatus comprises means for performing the method of any one of the above examples.

In yet another example, a system comprises a processor comprising: a first die including a first core and a second core; a second die including a first portion of an in-package memory; a third die including a second portion of the in-package memory; and where the processor is to be partitioned into: a first node having the first core and associated with a first portion of a platform memory coupled to the processor; a second node having the second core and associated with a second portion of the platform memory; a third node having the first portion of the in-package memory; and a fourth node having the second portion of the in-package memory, where the in-package memory and the platform memory comprise a common address space. The system further includes the platform memory coupled to the processor.

In an example, the first core and the first portion of the platform memory are to be associated with a first distance indicator and the first core and the first portion of the in-package memory are to be associated with a second distance indicator, the second distance indicator to indicate the first portion of the in-package memory as being more distant to the first core than the first portion of the platform memory.

In an example, the processor further comprises a first memory controller coupled to the first portion of the in-package memory and a second memory controller coupled to the first portion of the platform memory, where the second memory controller is to enable at least part of the first portion of the platform memory to accommodate an operating system allocation and the first memory controller is to enable at least part of the first portion of the in-package memory to accommodate a user allocation.

In an example, in a first memory mode the in-package memory is to be a cache memory for the platform memory, in a second memory mode the in-package memory and the platform memory comprise the common address space, and in a third memory mode at least the first portion of the in-package memory is to be the cache memory for the platform memory and at least the second portion of the in-package memory is to form the common address space with the platform memory.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor package comprising:
   a first die comprising at least one core to execute instructions;
   one or more second dies comprising an in-package memory, wherein the in-package memory is coupled to the at least one core via an intra-package link and a platform memory is to couple to the at least one core via an inter-chip link, the in-package memory associated with a first distance indication having a first value and the platform memory associated with a second distance indication having a second value, wherein the first value and the second value indicate that the platform memory is closer to the at least one core than the in-package memory, to cause the in-package memory to appear to be at a further distance from the at least one core than the platform memory;
   a first memory controller to interface with the in-package memory; and
   a second memory controller to interface with the platform memory, the platform memory external to the processor package.

2. The processor package of claim 1, further comprising a plurality of second dies comprising the in-package memory.

3. The processor package of claim 2, wherein each of the plurality of second dies is to couple to an input output interface of the first die.

4. The processor package of claim 3, wherein the input output interface comprises the first memory controller.

5. The processor package of claim 4, wherein the first die further comprises the second memory controller.

6. The processor package of claim 1, further comprising:
   a first node including the at least one core and a first portion of the platform memory;
   a second node including at least one other core and a second portion of the platform memory;
   a third node including a first portion of the in-package memory; and
   a fourth node including a second portion of the in-package memory.

7. The processor package of claim 6, wherein the at least one core is to link to the first portion of the platform memory with the second distance indication, and the at least one other core is to link to the first portion of the in-package memory with the first distance indication.

8. The processor package of claim 1, wherein the first die comprises a plurality of tiles, the plurality of tiles comprising a plurality of cores.

9. The processor package of claim 8, wherein the plurality of tiles further comprises at least one vector processing unit and at least one cache memory.

10. The processor package of claim 8, further comprising an interconnect network to couple the plurality of tiles.

11. The processor package of claim 1, wherein the in-package memory and the platform memory are to share a common address space, the in-package memory and the platform memory comprising a non-uniform memory architecture.

12. The processor package of claim 1, further comprising a table to store platform information to indicate that the platform memory is closer to the at least one core than the in-package memory.

13. The processor package of claim 12, wherein in response to the platform information, an operating system (OS) is to be preferentially allocated for storage in the platform memory and the first memory controller is to enable information of an application to be stored in the in-package memory.

14. The processor package of claim 1, wherein an operating system (OS) is to allocate storage of the OS and one or more first applications to the platform memory based at least in part on the second value of the second distance indication, and to allocate storage of one or more second applications to the in-package memory based at least in part on the first value of the first distance indication.

15. A method comprising:
   configuring a first node including one or more cores of a processor package and at least a portion of a platform memory coupled to the processor package, and associating a first distance between the one or more cores and the at least portion of the platform memory; and configuring a second node including at least a portion of an in-package memory of the processor package, and associating a second distance between the one or more cores of the first node and the at least portion of the in-package memory, wherein the second distance is greater than the first distance to cause the at least portion of the in-package memory to appear more distant to the one or more cores of the first node than the at least portion of the platform memory although the in-package memory is closer to the one or more cores of the first node than the at least portion of the platform memory.

16. The method of claim 15, further comprising populating one or more configuration tables with information regarding the platform memory and the in-package memory.

17. The method of claim 15, further comprising:
   in a first memory mode, maintaining the in-package memory to be a cache memory for the platform memory;
   in a second memory mode, providing a single address space formed of the platform memory and the in-package memory; and
   in a third memory mode, maintaining a first portion of the in-package memory to be the cache memory for the platform memory, and maintaining a second portion of the in-package memory to form the single address space with the platform memory.

18. A system comprising:
   a processor package comprising:
      a first die including a first core and a second core;
      a second die including a first portion of an in-package memory; and
      a third die including a second portion of the in-package memory;
   wherein the system comprises:
      a first node having the first core and associated with a first portion of a platform memory;
      a second node having the second core and associated with a second portion of the platform memory;
      a third node having the first portion of the in-package memory; and
      a fourth node having the second portion of the in-package memory; and
   the platform memory externally coupled to the processor package, the platform memory more distant to the first core and the second core than the in-package memory, wherein the first core and the first portion of the platform memory are to be associated with a first distance indicator having a first value and the first core and the first portion of the in-package memory are to be associated with a second distance indicator having a second value, the second value to indicate that the first portion of the in-package memory is more distant to the first core than the first portion of the platform memory.

19. The system of claim 18, wherein the processor package further comprises a first memory controller coupled to the first portion of the in-package memory and a second memory controller coupled to the first portion of the platform memory, wherein the second memory controller is to enable at least part of the first portion of the platform memory to be allocated to an operating system and the first memory controller is to enable at least part of the first portion of the in-package memory to be allocated to user software.

20. The system of claim 18, wherein in a first memory mode the in-package memory is to be a cache memory for the platform memory, in a second memory mode the in-package memory and the platform memory comprise a common address space, and in a third memory mode at least the first portion of the in-package memory is to be the cache memory for the platform memory and at least the second portion of the in-package memory is to form the common address space with the platform memory.

* * * * *